(12) United States Patent
Lu et al.

(10) Patent No.: US 7,693,865 B2
(45) Date of Patent: Apr. 6, 2010

(54) TECHNIQUES FOR NAVIGATIONAL QUERY IDENTIFICATION

(75) Inventors: Yumao Lu, Santa Clara, CA (US); Fuchun Peng, Sunnyvale, CA (US); Xin Li, Sunnyvale, CA (US); Nawaaz Ahmed, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 494 days.

(21) Appl. No.: 11/514,076

(22) Filed: Aug. 30, 2006

(65) Prior Publication Data

US 2008/0059508 A1   Mar. 6, 2008

(51) Int. Cl.
 *G06F 17/00* (2006.01)
(52) U.S. Cl. .................. 707/102; 707/200; 715/738
(58) Field of Classification Search ............. 707/1, 707/100, 102, 200; 709/217, 218, 219; 715/206, 715/238, 854
See application file for complete search history.

(56) References Cited

U.S. PATENT DOCUMENTS

| 7,356,530 B2* | 4/2008 | Kim et al. ................. 707/7 |
| 2005/0131866 A1* | 6/2005 | Badros et al. ............. 707/3 |
| 2007/0255689 A1* | 11/2007 | Sun et al. ................. 707/3 |

OTHER PUBLICATIONS

Robert Malouf, A comparison of algorithms for maximumentropy parameer estimation, 2002, CoNLL, pp. 49-55.*
Jerome H. Friedman, Stochastic Gradient Boosting, Mar. 26, 1999, http://www.salford-systems.com/treenet.html, pp. 1-10.*
Thorsten Joachims, Text Categorization with Support Vector Machines: Learning with Many Relevant Features, Nov. 11, 1997, University of Dortmund, pp. 1-14.*
In-Ho Kang, Transactional Query Identification in Web Search, 2005, Springer-Verlag, pp. 221-232.*
Pekalska et al, Pairwise Selection of Features and Prototypes, 2005, Springer Berlin, pp. 271-278.*
Pavlov et al., collaborative Filtering with Maximum Entropy, IEEE, 2004, pp. 40-48.*

\* cited by examiner

*Primary Examiner*—Fred I Ehichioya
(74) *Attorney, Agent, or Firm*—Hickman Palermo Truong & Becker LLP; Edward A. Becker

(57) ABSTRACT

To accurately classify a query as navigational, thousands of available features are explored, extracted from major commercial search engine results, user Web search click data, query log, and the whole Web's relational content. To obtain the most useful features for navigational query identification, a three level system is used which integrates feature generation, feature integration, and feature selection in a pipeline. Because feature selection plays a key role in classification methodologies, the best feature selection method is coupled with the best classification approach to achieve the best performance for identifying navigational queries. According to one embodiment, linear Support Vector Machine (SVM) is used to rank features and the top ranked features are fed into a Stochastic Gradient Boosting Tree (SGBT) classification method for identifying whether or not a particular query is a navigational query.

18 Claims, 3 Drawing Sheets

TECHNIQUES FOR NAVIGATIONAL QUERY IDENTIFICATION

FIELD OF THE INVENTION

The present invention relates to information search technology and, more particularly, to automated techniques for identifying navigational queries in the context of Web search.

BACKGROUND OF THE INVENTION

Web search has become a very popular method for seeking information. Users may have a variety of intents while performing a search of the Web. For example, some users may already have in mind the site they want to visit when they enter a query, however, the users may not know the URL of the site or may not want to type in the full URL, and may rely on the search engine to present a link to the site they know they want to visit. By contrast, other users may have no idea of what sites to visit before seeing the search results, where the information these users are seeking typically exists on more than one page. According to research, approximately 18% of queries in Web search are navigational queries, i.e., queries reflecting the situation when the user already has in intended site in mind. Therefore, correctly identifying navigational queries has a great potential to improve search performance. However, navigational query identification is not trivial due to a lack of sufficient information in Web queries, which are normally quite brief.

Recently, query classification is drawing significant attention. Many machine learning approaches that have been used in a general classification framework, including naive Bayes classifier, maximum entropy models, support vector machines, and gradient boosting tree, have their own advantages that suit certain problems. Due to the characteristics of navigational query identification, it is not apparent which approach performs best for identifying navigational queries. Further, machine learning models often suffer from feature dimensionality, in which use with a large number of features produces incorrect or no results. Consequently, most prior work in query identification is based on a small number of features that are obtained from limited resources.

In view of the foregoing, there is a need for techniques for accurately identifying navigational queries in real-time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the Figures of the accompanying drawings and in which like reference numerals refer to similar elements and in which.

DETAILED DESCRIPTION OF EMBODIMENTS OF THE INVENTION

Figure 1:
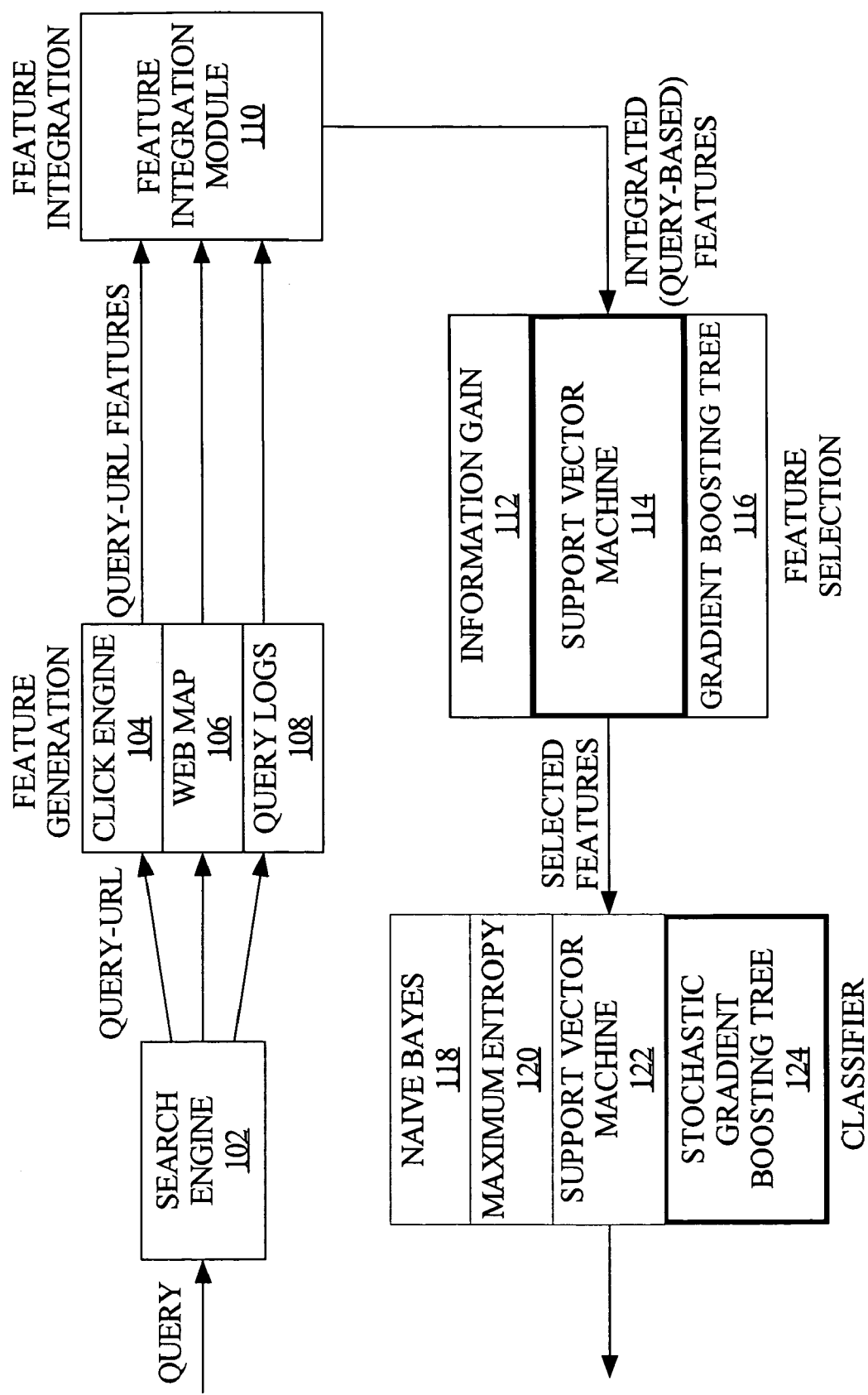
FIG. 1 is a block diagram that illustrates a system architecture for automatically identifying navigational queries, according to an embodiment of the invention.

Techniques are described for identifying navigational queries associated with Web search. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Function Overview of Embodiments

Identifying queries having different intents may dramatically improve search quality. For example, if a query is known to be navigational, search results can be improved via a special ranking function for navigational queries. Further, the presentation of the search results or the user-perceived relevance can also be improved by only showing the top results of the query and reserving the rest of the results page for other purposes because users only care about the top result of a navigational query.

Most previous studies in query identification are based on a small number of features that are obtained from limited resources. By contrast, according to the techniques described herein, thousands of available features are explored, extracted from major commercial search engine results, user Web search click data, query log, and the whole Web's relational content. To obtain the most useful features for navigational query identification, a three level system is used which integrates feature generation, feature integration, and feature selection in a pipeline.

Because feature selection plays a key role in categorization/classification methodologies, the best feature selection method is coupled with the best classification approaches (as determined through experimentation and research) to achieve the best performance for identifying navigational queries. Thus, features are ranked using one type of feature selection method before another method is used to train the classifier. According to one embodiment, linear Support Vector Machine (SVM) is used to rank features and the top ranked features are fed into a Stochastic Gradient Boosting Tree (SGBT) classification method for identifying whether or not a particular query is a navigational query. This approach is especially useful when redundant low quality heterogeneous features are encountered. The system and methodology described herein, coupling feature selection by SVM with linear kernel and SGBT as classification training method, is able to achieve an average performance of 88.1% F1 score in a five fold cross-validation.

Navigational Queries

Web search queries are conceptually divided into two categories: navigational and informational. All non-navigational queries are considered informational. For an informational query, typically there exists multiple excellent Web sites corresponding to the query which users are willing to explore. According to a canonical definition, a query is navigational if a user already has a Web site in mind and the goal of the corresponding query is simply to reach that particular site. For example, if a user issues the query term "yahoo" to a search engine, the user most likely wants to visit "yahoo.com". This canonical definition of navigational queries, however, is rather subjective and not easy to formalize.

Thus, herein the definition of navigational query is extended to a more general case, in which a query is navigational if the query has one and only one "perfect" site in the result set corresponding to this query. A site is considered as "perfect" if the site contains complete information about the query and lacks nothing essential. With this definition, a navigational query must have a corresponding result page that conveys perfectness, uniqueness, and authority. Unlike the canonical definition, the more generalized definition does not require the user to have a site in mind, which makes data labeling more objective and practical. For example, when a user issues a query "Fulton, N.Y.", it is not clear if the user knows about the Web site "www.fultoncountyny.org". However, this Web site has a unique authority and perfect content for this query and, therefore, the query "Fulton, N.Y." is labeled as a navigational query.

For another example, the query "national earth science teachers association" has only one perfect corresponding URL, "http://www.nestanet.org/", and therefore is labeled as a navigational query. The query "Canadian gold maple leaf" has several excellent corresponding URLs, including "http://www.goldfingercoin.com/ catalog-gold canadian-maple-leaf.htm", "http://coins.about.com/library/weekly/aa091802a.htm", and "http://www.onlygold.com/Coins/CanadianMapleLeafsFullScreen.asp". Therefore, the query "Canadian gold maple leaf" is labeled as a non-navigational, or informational, query.

Result Set Based Navigation Query Identification System

FIG. 1 is a block diagram that illustrates a system architecture for automatically identifying navigational queries, according to an embodiment of the invention. Generally, a search engine takes in a query and returns a set of URLs. The query and returned URLs are sent to a multi-level feature extraction system that generates and selects useful features, which is described in greater detail herein. The selected features are then input into a machine learning tool to train a classification model to determine whether or not the query is a navigational query.

The multiple level feature system depicted in FIG. 1 is one of the unique features of the system. Unlike prior approaches with a limited number of features or in a simulated environment, navigational query identification as described herein is based on real search data, a major search engine's user click information and a query log. In order to handle large amount of heterogeneous features in an efficient manner, a multi-level feature system is used, according to an embodiment. The first level is the feature generation level that calculates statistics and induces features from three resources: a click engine, a Web-map and a query log. The second level is responsible for integrating query-URL pair-wise features into query features by applying various functions. The third level is a feature selection module, which ranks features by using one or more different methods.

A query that is processed according to techniques described herein is submitted to a search engine 102. The search engine 102 operates to return a query result set. For example, in response to submission of a particular query to search engine 102, search engine 102 generates a corresponding result set of 100 URLs. Based on the query, and the corresponding query result set, a set of query-URL pairs are generated. For example, each URL from a query result set containing 100 URLs are paired with the input query to produce 100 query-URL pairs. Each query-URL pair from the set of query-URL pairs is then submitted to a feature generation module to generate a very large set of query-URL features.

Feature Generation

Generally, features are based on the query result set, and are related to the query to some extent. A feature is information that describes or categorizes a query and its result set, where the characteristics of the feature derive from the query and its result set. Features are typically a real number value that characterizes some correlation between the terms used in a query and aspects of the pages represented in the result set for the query. Thus, a given query-URL feature set can be represented as an n-dimensional vector of features. Features manifest in many ways. For non-limiting examples, query-URL pair-wise features may include the number of times that query terms appear alone and/or together and where in the page and/or URL; the number of times that query terms appear alone and/or together in inbound and/or outbound anchor text; click-through rate; session information (e.g., average time on page); the location of links in the page; and the like.

Queries are usually too brief and lack sufficient context to be classified. Therefore, more features need to be generated from other resources. According to one embodiment, one or more of the following three resources are used to generate features: (a) a click engine 104, (b) a Web map 106, and (c) query logs 108. The click engine 104 is a mechanism for recording and analyzing user click behavior. Click engine 104 is able to generate hundreds of features automatically based on user click-through distributions, i.e., representing user driven relevance and relationships between the query and the URL. A Web map 106 can be considered as a relational database that stores hundreds of induced features on page content, anchor text, hyperlink structure of Web pages, including the inbound URLs, outbound URLs, etc. Generally, features based on web map 106 represent how a URL is related to other pages within the site through terms in the query. Query logs 108 are able to provide features based on a set of words and various language model based features based on all the queries issued by users over a period of time. Generally, features based on query logs 108 represent features of the query itself.

The input to the feature generation module is a query-URL pair. For example, in one non-limiting implementation, for each query-URL pair, features (e.g., a total of 197) are generated and recorded from the following categories.

Click features: Click features record the click information associated with a URL. An example of a click feature is the click ratio, which is the ratio of the number of clicks on a particular URL K for query i to the total number of clicks for this query.

URL features: URL features measure the characteristics of the URL itself. An example of a URL feature is a URL match feature, which is defined as urlmr=l(p)/l(u), where l(p) is the length of the longest substring p of the query that presents in the URL and l(u) is the length of the URL u. This feature is based on the observation that Web sites tend to use their names in the URLs. The URL match feature distributions confer uniqueness and authority of the corresponding URLs.

Anchor text features: Anchor text is the visible text associated with a hyperlink, which provides useful information for navigational query identification. For example, one anchor text feature is the entropy of anchor link distribution. This distribution is basically the histogram of inbound anchor text for the destination URL. If a URL is pointed to by the same anchor texts, the URL is likely to contain perfect content. There are many other anchor text features that are computed by considering many factors, such as edit distance between query and anchor texts, diversity of the hosts, etc.

Because in one implementation the top 100 results for each query are used for query-URL pair-wise feature generation, and each query-URL pair has 197 features, in total there are 19,700 query-URL pair-wise features available for each query. Consequently, feature reduction is performed due to problems with classification based on high dimensionality, i.e., too much data. Therefore, before applying the feature selection method(s), a feature integration process is performed which merges relatively redundant query-URL features into a reduced set of integrated query-based features that are independent of any specific URL.

Feature Integration

For accurate classification of a query, features dependent only on the query are most beneficial. Hence, feature integration module 110 integrates the query-URL features into a set of query-based features that are independent of any specific URL. Feature integration not only integrates the query-URL features into a set of query-based features, but also functions in furtherance of dimension relaxation, i.e., data reduction. Thus, one result of feature integration is generation of fewer but better features for purposes of navigational query classification.

According to one embodiment, a feature integration operator is utilized, referred to as the normalized ratio, $r_k$, of rank k. The normalized ratio is defined as follows:

$$r_k(f_i) = [\max(f_j) - f_{jk}] / [\max(f_j) - \min(f_j)]; k = 2, 5, 10, 20. \quad \text{Equation (1)}$$

The design of this operator is motivated by the observation that the values of query-URL features for navigational queries and informational queries decrease at different rates. Taking the urlmr feature described above, for example, and considering a navigational query "Walmart" and an informational query "Canadian gold maple leaf", the feature values of the top 100 URLs are plotted for both queries. This study showed that the feature values for the navigational query drops quickly to a stable point, while the feature values for the information query was relatively unstable.

In addition to the foregoing normalized ratio operator, other statistics are used for feature integration purposes, including but not limited to mean, median, maximum, minimum, entropy, standard deviation, and the values in the top five positions of the result set query-URL pair-wise features. Thus, according to one non-limiting implementation, a total of 15 measurements remain for a query instead of 100 associated with the top 100 URLs for the query. Thus, for each query in the context of this implementation, the dimension of a feature vector is m=15×197=2955, rather than 19,700. Regardless of the number of integrated query-based features output by feature integration module 110, these query features are sent to a feature selection module for selecting the best features for purposes of identifying whether or not the query is a navigational query.

Feature Selection Methods

Many methods are available for use in feature selection for text classification, including information gain, mutual information, document frequency thresholding, Chi-square statistics. For example, information gain is one of the most effective methods in the context of text categorization. In addition to information gain, other feature selection methods based on SVM's feature coefficients and stochastic gradient boosting tree's variable importance can be used. FIG. 1 depicts the feature selection module as comprising the following methods: information gain 112, support vector machine (SVM) 114, and gradient boosting tree (GBT) 116. According to embodiments, any one or more of these methods may be implemented and applied for purposes of feature selection, in order to determine the best features for classifying the query, i.e., for identifying whether or not the query is a navigational query. However, experimentation and research has shown that linear SVM is the most effective method for identifying navigational queries. Hence, according to one embodiment, a linear SVM method alone is used for selecting the best features from the set of query features output from the feature integration module 110, for input to a classifier method.

Linear SVM Feature Selection

A linear SVM method is described in "Categorizing Web Queries According to Geographical Locality" by L. Gravano, V. Hatzivassiloglou, and R. Lichtenstein, available in *ACM 12th Conference on Information and Knowledge Management (CIKM)*, pages 27-30, New Orleans, La., November 2003; the entire content of which is incorporated by reference in its entirety for all purposes as if fully disclosed herein. Linear SVM produces a hyperplane as well as a normal vector w. The normal vector w serves as the slope of the hyperplane classifier and measures the relative importance that each feature contributes to the classifier. An extreme case is when there is only one feature correlated to sample labels, then the optimal classifier hyperplane must be perpendicular to this feature axle.

The L-2 norm of w, in the objective, denotes the inverse margin. Additionally, the L-2 norm of w can be viewed as a Gaussian prior of random variable w. Other work has shown that sparse results may be achieved by assuming a Laplace prior and using the L-1 norm.

In contrast with the information gain method, the linear SVM normal vector w is not determined by the whole body of training samples. Instead, the linear SVM normal vector w is determined by an optimally determined subset, support vectors, that are critical to be classified. Another difference between linear SVM and information gain methods is that, for SVM, normal vector w is solved jointly by all features instead of one by one independently.

Information Gain Feature Selection

Information gain is frequently used as a measure of feature goodness in text classification. Information gain method measures the number of bits of information obtained for category prediction by knowing the presence or absence of a feature. Let $y_i$: i=1 ... m be the set of categories, information gain of a feature f is defined as $$IG(f) = -\Sigma(\text{from } i = 1 \text{ to } m)[P(y_i)\log P(y_i)] + \quad \text{Equation (2)}$$
$$P(f)\Sigma(\text{from } i = 1 \text{ to } m)[P(y_i \mid f)\log P(y_i \mid f)] +$$
$$P(f^-)\Sigma(\text{from } i = 1 \text{ to } m)[P(y_i \mid f^-)\log P(y_i \mid f^-)]$$

where $f^-$ indicates f is not present.

According to one embodiment, the information gain is computed for each unique feature and the top ranked features are selected for use by a classifier method for determining whether or not the query is a navigational query.

Stochastic Gradient Boosting Tree Feature Selection

Boosting methods construct weak classifiers using subsets of features and combine them by considering their predication errors. It is a natural feature ranking procedure in that each feature is ranked by its related classification errors.

Tree based boosting methods approximate relative influence of a feature $x^j$ as $$J^2_j = \Sigma(\text{splits on } x^j) I^2_k \quad \text{Equation (3)}$$

where $I^2_k$ is the empirical improvement by k-th splitting on $x^j$ at that point.

Unlike the information gain model that considers one feature at a time or the SVM method that considers all the features at one time, the boosting tree model considers a set of features at a time and combines them according to their empirical errors.

Let R(X) be a feature ranking function based on data set X. Information gain feature ranking depends on the whole training set $X_{Info}=X_{tr}$. Linear SVM ranks features based on a set of optimally determined datasets. That is, $X_{SVM}=X_{SV}$, where $X_{SV}$ is the set of support vectors. The stochastic gradient boosting tree (GSBT) uses multiple randomly sampled data to induce trees, and ranks features by their linear combination. Its ranking function can be written as $$R_{SGBT}(X_{SGBT})=\Sigma(\text{from } t=1 \text{ to } T) \beta_t R^t(X_t), \quad \text{Equation (4)}$$

where $X_t$ is the training set randomly sampled at iteration t.

These 'best' query features selected via the feature selection process are sent to a classification module for identifying, based on these best features, whether or not the query is a navigational query. Research has shown that use of approximately fifty features for purposes of classifying queries, e.g., for accurately identifying navigational queries, is effective.

Classification Methods

The most popular generative (such as naive Bayes 118 method), descriptive (such as Maximum Entropy 120 method), and discriminative (such as support vector machine 122 and stochastic gradient boosting tree 124) learning methods can be used as classification methods for identifying navigational queries. According to embodiments, any one or more of these methods may be implemented and applied for purposes of classification, for identifying whether or not the query is a navigational query. However, experimentation and research has shown that stochastic gradient boosting tree (SGBT) is the most effective method for identifying navigational queries. Hence, according to one embodiment, a SGBT method alone is used for classifying the query.

Gradient Boosting Tree Classifier

Gradient boosting tree model seeks a parameterized classifier, similar to SVM. Gradient boosting tree methods are described in a publication by T. Hastie, R. Tibshirani, and J. Friedman, entitled "The Elements of Statistical Learning: Data Mining, Inference, and Predication" from Springer Verlag, New York, 2001; and in a publication by J. H. Friedman, entitled "Stochastic Gradient Boosting" in *Computational Statistics and Data Analysis*, 38(4):367-378, 2002; the entire content of both of which is incorporated by reference in its entirety for all purposes as if fully disclosed herein.

A gradient boosting tree method iteratively fits an additive model $$f_t(x)=T_t(x;\Theta_0)+\lambda\Sigma(\text{from } t=1 \text{ to } T)\beta_t T_t(x; \Theta_t), \quad \text{Equation (5)}$$

such that a certain loss function $L(y_i, f_T(x+i))$ is minimized, where $T_t(x; \Theta_t)$ is a tree at iteration t, weighted by parameter $\beta_t$. With a finite number of parameters, $\Theta_t$ and $\lambda$ is the learning rate. At iteration t, tree $T_t(x; \beta)$ is induced to fit the negative gradient by least squares. That is $$\Theta^{\wedge}=\arg\min_\beta \Sigma(\text{from } i \text{ to } N)(-G_{it}-\beta_t T_t(x_i); \Theta)^2, \quad \text{Equation (6)}$$

where $G_{it}$ is the gradient over current prediction function $$G_{it}=[(\partial L(y_i,f(x_i))/(\partial f(x_i))]_{f=f_{t-1}} \quad \text{Equation (7)}$$

The optimal weights of trees $\beta_t$ is determined $$\beta_t=\arg\min_\beta \Sigma(\text{from } i \text{ to } N) L(y_i, f_{t-1}(x_i)+\beta T(x_i, \Theta)). \quad \text{Equation (8)}$$

If L-2 loss function $[y_i-f(x_i)]^2/2$ is used, we have the gradient $G(x_i)=-y_i+f(x_i)$. The Bernoulli loss function $$-2\Sigma_i(y_i f(x_i)-\log(1+\exp(f(x_i)))) \quad \text{Equation (9)}$$

is used and the gradient has the form $$G(x_i)=y_i-[(1)/(1+\exp(-f(x_i)))] \quad \text{Equation (10)}$$

During each iteration of gradient boosting, the feature space is further partitioned. This kind of rectangular partition does not require any data preprocessing and the resulting classifier can be very robust. However, the classifier may suffer from the dead zoom phenomenon, where prediction is not able to change with features, due to its discrete feature space partition. It has been suggested that it helps performance by sampling uniformly without replacement from the dataset before estimating the next gradient step, a method called stochastic gradient boosting.

Naive Bayes Classifier

A simple yet effective learning algorithm for classification is based on a simple application of Bayes' rule:

$$P(y \mid q) = \frac{P(y) \times P(g \mid y)}{P(q)} \quad \text{Equation (11)}$$

In query classification, a query q is represented by a vector of K attributes $q=(v_1, v_2, \ldots v_K)$. Computing $p(q|y)$ in this case is not trivial, because the space of possible documents $q=(v_1, v_2, \ldots v_K)$ is vast. To simplify this computation, the naive Bayes model introduces an additional assumption that all of the attribute values, $v_j$, are independent given the category label c. That is, for $i \neq j$, $v_i$ and $v_j$ are conditionally independent given q. This assumption greatly simplifies the computation by reducing equation (10) to $$P(y \mid q) = P(y) \times \frac{\Pi(\text{from } j = 1 \text{ to } K) P(v_j \mid y)}{P(q)} \quad \text{Equation (12)}$$

Based on equation (12), a maximum a posteriori (MAP) classifier can be constructed by seeking the optimal category which maximizes the posterior $P(c|d)$:

$$\begin{aligned} y^* &= \arg\max(y \in Y)\{P(y) \times \Pi(\text{from } j = 1 \text{ to } K) P(v_j \mid y)\} \\ &= \arg\max(y \in Y)\Pi(\text{from } j = 1 \text{ to } K) P(v_j \mid y)\} \end{aligned} \quad \text{Equation (13)}$$

Equation (13) is called the maximum likelihood naive Bayes classifier, obtained by assuming a uniform prior over categories.

To cope with features that remain unobserved during training, the estimate of $P(v_j|y)$ is usually adjusted by Laplace smoothing $$P(v_j|y)=(N^y_j+a_j)/(N^y+a) \quad \text{Equation (14)}$$

where $N^y_j$ is the frequency of attribute j in $D_y$, $N_y=\Sigma_j N^y_j$, and $a=\Sigma_j a_j$. A special case of Laplace smoothing is "add one" smoothing, obtained by setting $a_j=1$.

Maximum Entropy Classifier

Maximum entropy is a general technique for estimating probability distributions from data and has been successfully applied in many natural language processing tasks. The overriding principle in maximum entropy methods is that when nothing is known, the distribution should be as uniform as possible, i.e., have maximal entropy. Labeled training data are used to derive a set of constraints for the model that characterize the class-specific expectations for the distribution.

Constraints are represented as expected values of features. An improved iterative scaling algorithm finds the maximum entropy distribution that is consistent with the given constraints. In a query classification scenario, maximum entropy estimates the conditional distribution of the class label given a query, where a query is represented by a set of features. The labeled training data are used to estimate the expected value of these features on a class-by-class basis. Improved iterative scaling finds a classifier of an exponential form that is consistent with the constraints from the labeled data.

It can be shown that the maximum entropy distribution is always of the exponential form:

$$P(y|q) = [1/Z(q)] \exp(\Sigma_i \lambda_i f_i(q; y)) \quad \text{Equation (15)}$$

where each $f_i(q; y)$ is a feature, $\lambda_i$ is a parameter to be estimated and $Z(q)$ is simply the normalizing factor to ensure a proper probability: $Z(q) = \Sigma_y \exp(\Sigma_i \lambda_i f_i(q; y))$. Learning of the parameters can be performed using generalized iterative scaling (GIS), improved iterative scaling (IIS), or quasi-Newton gradient-climber.

Support Vector Machine Classifier

Support Vector Machine (SVM) is one of the most successful discriminative learning methods. A SVM method seeks a hyperplane to separate a set of positively and negatively labeled training data. The hyperplane is defined by $w^T x - b = 0$, where the parameter $w \in R^m$ is a vector orthogonal to the hyperplane and $b \in R$ is the bias. The decision function is the hyperplane classifier $$H(x) = \text{sign}(w^T x + b). \quad \text{Equation (16)}$$

The hyperplane is designed such that $y_i(w^T x - b) \geq 1 - \xi_i$, $V_i = 1, \ldots, N$, where $x_i \in R^m$ is a training data point and $y_i \in \{+1, -1\}$ denotes the class of the vector xi. The margin is defined by the distance between the two parallel hyperplanes $w^T x - b = 1$ and $w^T x - b = -1$, i.e., $2/\|w\|_2$. The margin is related to the generalization of the classifier. The SVM training problem is defined as follows:

$$\text{minimize}(1=2) w^T w + \gamma 1^T \xi.$$

$$\text{subject to } y_i(w^T x_i + b) \geq 1 - \xi_i, i = 1, \ldots, N$$

$$\xi \geq 0$$

where the scalar $\gamma$ is called the regularization parameter, and is usually empirically selected to reduce the testing error rate.

The basic SVM formulation can be extended to nonlinear case by using nonlinear kernels. Interestingly, the complexity of an SVM classifier representation does not depend on the number of features, but rather on the number of support vectors (the training examples closest to the hyperplane). This property makes SVMs suitable for large dimensional classification problems.

Discussion of Experimental Research

An interesting result from experimental research is the features selected for navigational query identification. Those features are mostly induced from user click information. This is intuitively understandable because if a query is navigational, the navigational URL is the most clicked one. On the other hand, it might be risky to completely rely on click information. Performance is better if query log, URL, anchor text, and other Web map features are taken into consideration.

One observation is that linear SVM and boosting tree have better feature selection power than information gain. The reason that information gain performs inferior to linear SVM and boosting tree is probably due to the fact that information gain considers each feature independently, while linear SVM considers all features jointly and boosting tree composites feature rank by sum over all used features. The results show that URL, anchor text and other metrics are helpful when they are considered jointly with click features.

The most important result is that the stochastic gradient boosting tree classification method coupled with linear SVM feature selection method achieves much better results than any other combination. In the context of identifying navigational queries, the data has very high dimensionality considering the small sample size. The boosting tree method needs to partition an ultra-high dimensional feature space for feature selection. However, the stochastic step does not have enough data from which to sample. Therefore, the boosted result might be biased by earlier sampling and trapped in a local optimum. Support vector machine, however, is able to find an optimally determined subset of training samples, namely support vectors, and ranks features based on those vectors. Therefore, the SVM feature selection step makes up the disadvantage of the stochastic boosting tree in its initial sampling and learning stages that may lead to a local optimum.

As expected, naive Bayes classifier is marginally performant for the navigational query identification problem. Naive Bayes classifier is also the only classifier that performs worse with feature selection. Naive Bayes classifier works well when the selected features are mostly orthogonal. However, in this problem, all features are highly correlated. On the other hand, classification methods such as boosting tree, maximum entropy model and SVM do not require orthogonal features.

A Method for Identifying Navigational Queries

Figure 2:
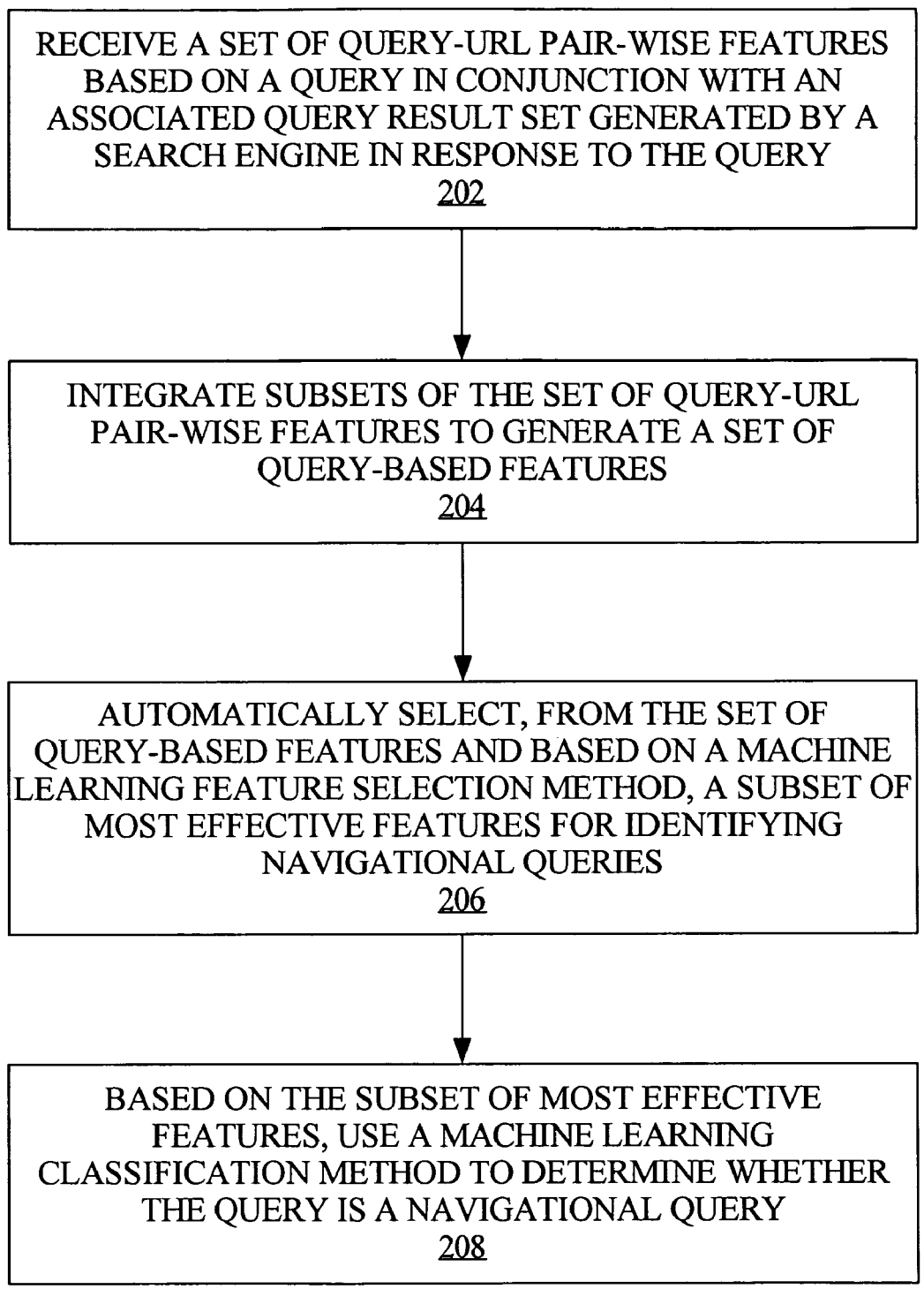
FIG. 2 is a flow diagram that illustrates a method for identifying navigational queries, according to an embodiment of the invention.

FIG. 2 is a flow diagram that illustrates a method for identifying navigational queries, according to an embodiment of the invention. The method depicted in FIG. 2 is a computer and/or machine-implemented method in which a computer or machine performs the method, such as by one or more processors executing instructions. For example, the method may be performed on or by a computer system such as computer system 300 of FIG. 3.

At block 202, a set of query-URL pair-wise features are received, which are based on a query in conjunction with a corresponding query result set generated by a search engine in response to the query. For example, in response to issuance of a query to query engine 102 (FIG. 1) and return of a corresponding result set (e.g., the top ranked 100 URLs for the query), the query is associated with each of the URLs from the result set to generate a set of query-URL pairs. From the set of query-URL pairs, numerous features are generated based on information from various resources, where the information is about the query-URL pairs, such as described herein in reference to feature generation. According to one embodiment, features are generated based on one or more of a click engine 104, a web map 106, and query logs 108 (FIG. 1). Thus, a set of query-URL pair-wise features are sent to and received by the method depicted in FIG. 2.

At block 204, subsets of the set of query-URL pair-wise features are integrated together to generate a set of query-based features, which are now independent of specific URLs. According to embodiments, as described herein in reference to feature integration, the set of query-based features may be based on various statistics and/or the normalized ratio operator (Equation (1)). For example, multiple click-based query-URL features are integrated into a small set of one or more query-based click features, and/or multiple URL-based query-URL features are integrated into a small set of one or more query-based URL features; and/or multiple anchor text-based query-URL features are integrated into a small set of one or more query-based anchor text features.

At block 206, a subset of the most effective (e.g., 'best') features for identifying navigational queries is automatically selected from the set of query-based features, based on one or more machine learning feature selection methods or techniques. According to a preferred embodiment, a linear support vector machine method is used to select the most effective features for classifying navigational queries. Use of a linear SVM 114 (FIG. 1) feature selection technique has been found to produce very good results, but is considered counter-intuitive because query classification is not a linear problem space. As described herein, various implementations may alternatively use information gain 112 (FIG. 1) or gradient boosting tree 116 (FIG. 1) methods for the feature selection process.

At block 208, a machine learning classification method is used, with the subset of most effective features as input to a classifier, to determine whether or not the original query is a navigational query. According to a preferred embodiment, a stochastic gradient boosting tree method is used for classifying navigational queries. Use of a SGBT 124 (FIG. 1) classification technique has been found to produce very good results, but is considered counter-intuitive because typically the same type of method is used for both feature selection and classification, e.g., classifiers often comprise their own feature selection process which uses the same type of method as the classification process. Stated otherwise, coupling the most effective (e.g., discovered through extensive experimentation) feature selection method-classification method pair produces the best results, i.e., an average performance of 88.1% F1 score in a five fold cross-validation. As described herein, various implementations may alternatively use naive Bayes 118 (FIG. 1) or maximum entropy 120 (FIG. 1) or SVM 122 methods for the query classification process. As discussed, once a query is identified as a navigational query, corresponding result set listings and/or result set pages can be presented to the querying user, where different ways in which a navigational query result set is presented may vary from implementation to implementation.

Hardware Overview

Figure 3:
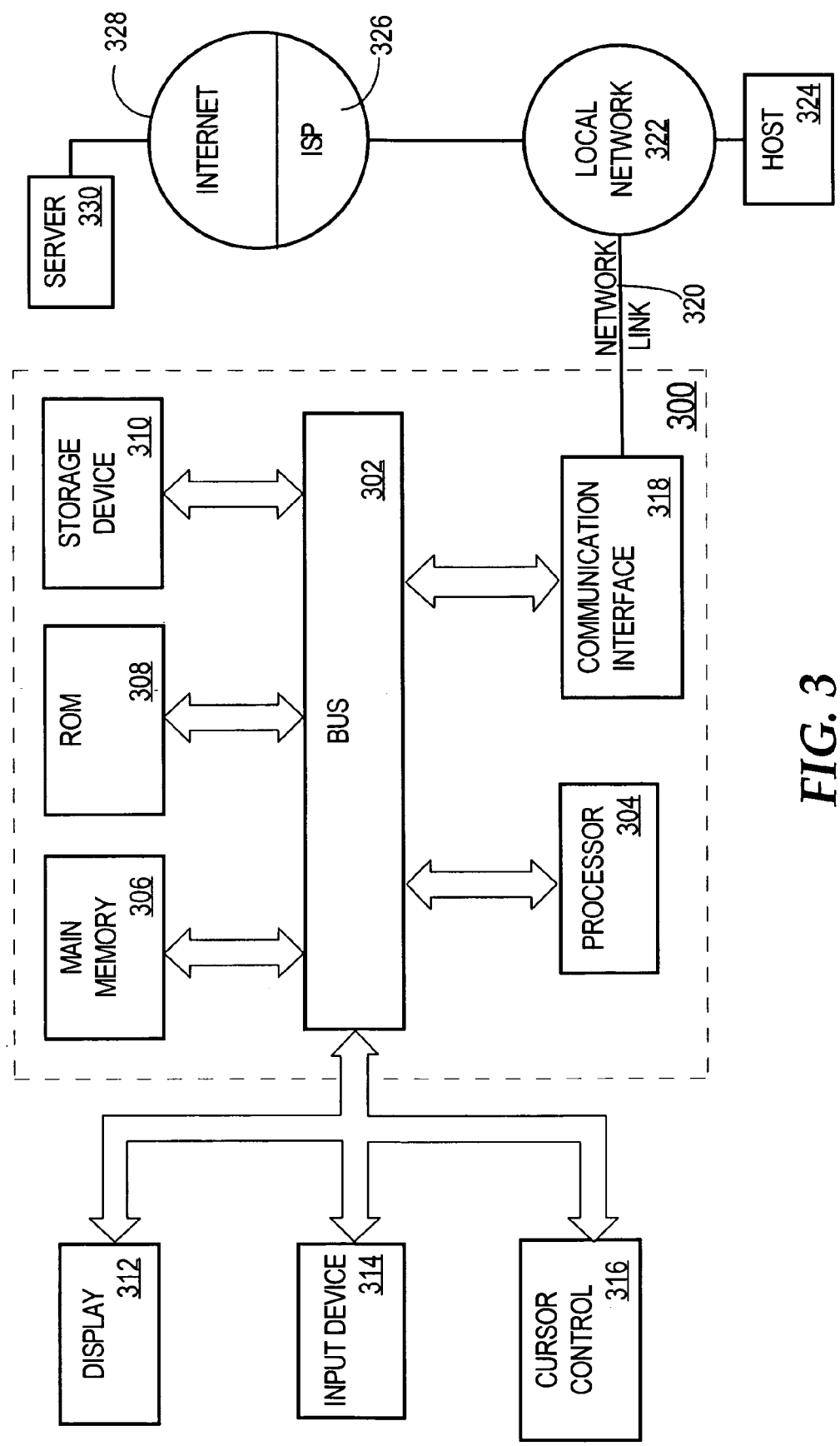
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising performing a machine-executed operation involving instructions for identifying a navigational query, wherein the machine-executed operation is at least one of:

A) storing said instructions onto a volatile or non-volatile storage medium; and B) executing the instructions;

wherein said instructions are instructions which, when executed by one or more processors, cause performance of:

determining whether a query is a navigational query by
receiving a set of query-URL pair-wise features based at least in part on said query in conjunction with an associated query result set;
integrating subsets of said set of query-URL pair-wise features to generate a set of query-based features that are independent of any particular URL;
automatically selecting, from said set of query-based features, a subset of most effective features for identifying navigational queries, wherein said selecting is based on a machine learning feature selection method;
based on said subset of most effective features, using a machine learning classification method to determine whether said query is a navigational query.

2. The method of claim 1, wherein said machine learning feature selection method is a linear support vector machine method.

3. The method of claim 1, wherein said machine learning classification method is a stochastic gradient boosting tree method.

4. The method of claim 1, wherein said machine learning feature selection method is a linear support vector machine method and said machine learning classification method is a stochastic gradient boosting tree method.

5. The method of claim 1, wherein said receiving comprises receiving a set of query-URL pair-wise features based on information from a click engine, a Web-map, and a query log.

6. The method of claim 1, wherein said receiving comprises receiving a set of query-URL pair-wise features comprising click features, URL features, and anchor text features.

7. The method of claim 1, wherein said integrating comprises generating said set of query-based features based on statistics associated with said subsets of said set of query-URL pair-wise features.

8. The method of claim 1, wherein said integrating comprises generating said set of query-based features based in part on statistics associated with a click-based subset of said set of query-URL pair-wise features.

9. The method of claim 1, wherein said integrating comprises generating said set of query-based features based in part on statistics associated with a URL-based subset of said set of query-URL pair-wise features.

10. The method of claim 1, wherein said integrating comprises generating said set of query-based features based in part on statistics associated with an anchor text-based subset of said set of query-URL pair-wise features.

11. The method of claim 1, wherein said integrating comprises generating said set of query-based features based in part on a normalized ratio operator defined as $r_k(f_i)=[\max(f_j)-f_{jk}]/[\max(f_j)-\min(f_j)]$ where k=2, 5, 10, 20.

12. The method of claim 1, wherein said selecting comprises selecting, from said set of query-based features, a subset of approximately fifty most effective features for identifying navigational queries.

13. The method of claim 1, wherein said instructions are instructions which, when executed by one or more processors, cause performance of:

in response to determining that said query is a navigational query, returning only a subset of said query result set.

14. The method of claim 1, wherein said machine learning feature selection method is an information gain method.

15. The method of claim 1, wherein said machine learning feature selection method is a gradient boosting tree method.

16. The method of claim 1, wherein said machine learning classification method is a naive Bayes method.

17. The method of claim 1, wherein said machine learning classification method is a maximum entropy method.

18. The method of claim 1, wherein said machine learning classification method is a support vector machine method.

* * * * *